Figure 1:
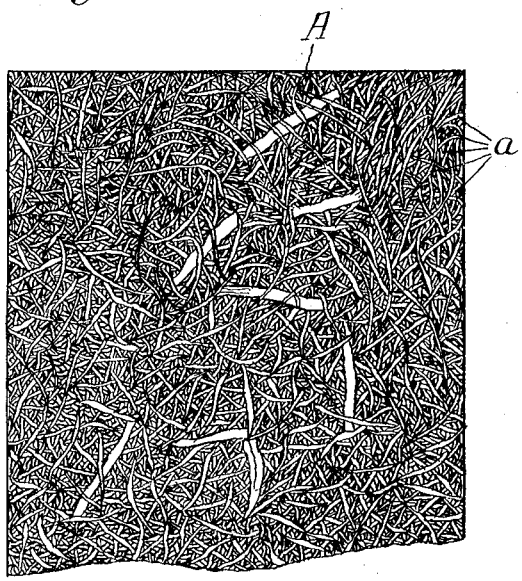

July 5, 1927. 1,634,462
F. J. HALLAUER
COMPOSITION BOARD AND METHOD OF MAKING THE SAME
Filed Nov. 2, 1925

Inventor:
Frank J. Hallauer,
By Samuel N. Pond,
Atty.

Patented July 5, 1927.

1,634,462

UNITED STATES PATENT OFFICE.

FRANK J. HALLAUER, OF MADISON, WISCONSIN.

COMPOSITION BOARD AND METHOD OF MAKING THE SAME.

Application filed November 2, 1925. Serial No. 66,139.

This invention relates to a new composition building material for use as a wall board in the construction of walls, panels, partitions and other structural parts of buildings in which exceptional strength, stiffness, with lightness, fire-resistance, heat-insulation, sound-deadening and minimal swelling characteristics are major requirements.

Composition wall boards of various kinds have been known for some time. Mixtures of finely divided wood and cement have been rolled into sheets and used, often, with some sort of reinforcement. Compositions of a different kind have been made by reducing wood to a pulp by chemical means and subsequently pressing it into sheets.

The objection to finely divided wood compositions, such as those made of sawdust, is that they owe their cohesive strength solely to the cement or binder that is used to hold the grains together. Consequently, a large amount of cement or binder must be used if the board is to be strong enough for structural purposes. Furthermore, the mixture of wood, filler and binder must be compressed into a practically solid mass. Such a mass is likely to be heavy, brittle and lacking in insulating properties. A further objection is that sawdust compositions are likely to lose their strength, shape and integrity as a result of exposure to moisture. The swelling of the individual grains of wood, when such a composition is moistened, causes the mass to expand, which results in buckling, warping, crumbling and kindred evils.

Boards fabricated from wood pulp and other fibrous materials are generally superior to sawdust compositions. Wood pulp and other small fibers have a natural tendency to felt together, which makes it possible to employ comparatively light pressures and obtain sheets that are characterized by lightness, porosity and good insulating properties. An objection which applies not only to boards made of wood pulp but also to those made of shredded wood which has been subjected to treatment with an alkali is that the action of the heat and chemicals employed in the pulping or other process is so drastic that the wood fibers are injured thereby, and some of their most valuable properties are destroyed. As a result, pulp and fiber boards have not the strength and elasticity of natural wood. Furthermore, the treatment with alkali, which is employed for the purpose of pulping or cementing, dissolves the lignins and resins of the wood and by promoting hydrolysis and alters its chemical and physical properties so that the resulting boards are more susceptible to the effect of moisture than is natural wood. In fact, the warping and bulging of pulp boards have been such serious drawbacks that they have led to the use of the so-called gypsum boards in spite of the fact that gypsum boards are heavy and are known to be very brittle and easily broken during transportation.

The object of my invention is to make a composition board that will be strong, tough and resilient; that will be heat-insulating; that can be handled and transported without fear of breakage; that can be sawed and nailed; that will stand without reinforcement; that will not swell, buckle, warp, bulge nor check; that will remain rigidly and durably in place and become in effect a structural element of the building.

I accomplish this object by utilizing the strength and resiliency of long cut strands of wood which have not been acted upon by chemicals. Wood in the form of long slender strands has a natural tendency to curl, intertwine and tangle together so that a mass of such strands rolls into a ball, which being loose and open affords an exceptionally good opportunity for the deposition in finely divided form of the special glue which I have designed for the purpose of binding the individual strands together.

When such a tangled mass of strands of natural wood as I have described is moistened with finely divided droplets of glue and strongly compressed into a thin board, practically all of the strands are forced to lie in a horizontal plane. They dispose themselves at random in every conceivable direction in the plane of the board. According to the law of probabilities, there will be just as many strands lying lengthwise of the board as there are lying crosswise. It is this uniform distribution of long strands of natural wood in the plane of the board that mainly gives the board I have invented its novel character.

Natural wood is exceedingly strong in tension parallel to the grain. It is reported to be stronger than steel, weight for weight, in this direction. Across the grain, however, wood is very weak; it is the weakness of wood across the grain that puts serious limits on its usefulness as a material of construction. This weakness has led to the expedient of gluing sheets of veneer together in the form of plywood, the particular merit of which lies in the arrangement of alternate layers at right angles to one another so that the along-the-grain tensile strength of wood is made available both lengthwise and crosswise of the panel for purposes of strengthening and stiffening and for the prevention of swelling.

The distribution of strands of natural wood fiber in every conceivable direction in the horizontal plane accomplishes approximately the same purpose in my board as the crossing of alternate layers of veneer accomplishes in plywood. The along-the-grain tensile strength of natural wood in all the strands lying in any given direction in the horizontal plane is available for the prevention of any elongation of the board in that direction. Thus, the full tensile strength of natural wood is utilized for the prevention of bending, splitting, swelling and warping. As a matter of fact, I have found the lengthwise and crosswise swelling of my composition board in going from a dry to a water-soaked condition to be less than 0.5%, which is no greater than the amount of the along-the-grain swelling of solid wood, which is usually considered negligible. Since lengthwise and crosswise swelling are practically prevented, my board will not warp, buckle nor bulge on wetting nor check on drying.

In spite of the heaviest pressure I employ in making my board it inevitably contains a number of small air spaces. Hence, it is less conductive of heat and sound than a solid board of the same thickness.

My invention is further explained by the following, which illustrates a typical application of it.

The properties of my finished board depend to a considerable extent on the stock from which it is made. For most purposes I prefer to use strands of wood which are approximately 3/64 inch wide, 1/64 inch thick and 8 to 18 inches long. Such strands are obtainable in certain kinds of the material commonly known as excelsior, which is manufactured by taking wood in the form of bolts or billets 14 to 18 inches long and preparing long, slender shavings therefrom by cutting the wood carefully along the grain so as to avoid the production of short, weak, or cross-grained strands. This cutting is done by a process of alternately scoring and shaving the bolt so that strands of wood of substantially the dimensions above recited are produced. Long, slender shavings of dry wood of all species tend to assume a curved shape and form stiff curls which tangle together in loose, open masses which are not easily crushed. In this respect excelsior is markedly different from shredded wood, because shredded wood consists of comparatively short pieces that have been cut or torn off, usually across the grain; whereas excelsior is a long, narrow shaving carefully cut along the grain so as to preserve the full tensile strength of the wood. It is essential in the board I have invented that the strength of the individual strands shall be at a maximum, because, as hereinbefore explained, it is the arrangement of long strands of natural wood in the plane of the board that gives my board its exceptional strength and stiffness. Slender, straight-grained shavings, such as those that comprise excelsior, are further differentiated from shredded wood by their stiffness and resiliency, which cause them to form light, open masses suitable for spraying or sprinkling. Because of its great strength and resiliency excelsior has a tendency to resist compression, whereas shredded wood is very easily compressed and compacted. The resiliency of excelsior and its strong resistance to crushing account for its use in packing and upholstering. The same properties of excelsior are utilized in my board, because excelsior strands, since they are superior to any other kind of divided wood in strength and resiliency, allow themselves, when pressed into a board, to be distributed at the greatest practicable distance from the center of mass, thus giving maximum strength and stiffness with minimum weight, in accordance with the well known principle of mechanics that accounts for an I-beam's being stronger and more rigid than a solid bar of the same weight. The excelsior need not be of exactly the size I mentioned, since the strands may vary somewhat from the size given and still come within the scope and intent of my invention. In fact, I consider that kind of excelsior which is known in the trade as "wood wool", as entirely suitable for use in making my board.

I have noticed, however, that short strands do not curl and twist as much as long strands. Hence, they do not give as loose and fluffy a mass for spraying, nor do they furnish a sufficiently long-threaded and intricately woven board when compressed. I have also noted that very coarse strands give a board that is comparatively light, porous and weak, whereas very fine strands, since they present a very large surface of wood to be glued, require so large a consumption of glue as to render the manufacture of a board therefrom inexpedient for some purposes by reason of expense. The glue I use is strongly adhesive and water-resistant. Hence, it is possible to use green, that is, wet, excelsior; and it may be of any species, although for ordinary purposes I prefer birch, basswood, poplar or pine.

In order to meet all the requirements of my invention I found it necessary to develop a glue for that specific purpose. It must be thinner than any ordinary wood-working glue in order that it may be sprayed and deposited on the excelsior in the form of minute droplets. At the same time, it must be a glue of exceptionally great adhesive properties in order to hold the strands of excelsior securely together, in spite of its thinness, at their small areas of contact. It must be a glue which has a strength approximately equal to that of wood itself. It must also be free from mineral and other insoluble matter which would produce sediment and interfere with a proper operation of the spray. It must be a glue that will set quickly, even when cold, in order to minimize the length of time required for pressing, although it must not set so quickly as to clog the sprays or solidify in the air before reaching the wood. It must be water-resistant in order to unite the strands by a water-resistant bond. It must not be strongly alkaline, because alkaline solutions impair the strength and resiliency of wood. I have found that certain water resistant protein glues respond adequately to all the requirements of my invention. As an example of a water-resistant protein glue which is well suited for use in carrying out my invention I cite the glue made of the protein of cows' milk; namely, casein, and preferably composed of the following ingredients and mixed according to the following formula.

| | Pounds. |
|---|---|
| Casein | 1 |
| Water | 3.5 |
| Calcium hydroxide | 0.33 |
| Water | 1 |
| Sodium silicate | 0.75 |
| Calcium chloride | 0.05 |
| Water | 0.2 |

Calcium hydroxide is used in the above formula to make the glue water-resistant. The solution of calcium chloride, which is added at the end, is used to reduce the alkalinity of the glue to a minimal amount. It acts upon the small amount of alkali remaining in the glue as a result of the addition of sodium silicate, of which sodium hydroxide is always a constituent. The reaction proceeds according to the following equation:

$$2NaOH + CaCl_2 = 2NaCl + Ca(OH)_2,$$

whereby the soluble alkali, sodium hydroxide, is converted into the rather insoluble and less caustic calcium hydroxide. The addition of calcium chloride solution must be carried out carefully and with constant stirring, and it must be discontinued if at any time the glue is thickened thereby to such a degree as to threaten to clog the sprays. I have found calcium acetate and other calcium salts to be susceptible of being used interchangeably with calcium chloride as an agent for reducing the alkalinity of casein glue.

Although a glue in which casein is the protein used serves best under certain conditions, I may use any other protein of either animal or vegetable origin without going outside the field I wish to reserve for my invention. For instance, I may use the protein of soya beans instead of casein, and I may substitute soya bean protein for part or all of the casein in the above-mentioned formula, or I may use an adhesive solution of soya bean protein, such as is known in the wood-working trade as soya bean glue. Another protein I may employ is blood albumin, for I have found that an extremely water-resistant board can be made by spraying excelsior or wood wool with an adhesive solution of blood albumin and subsequently hotpressing the same. I do not, however, wish to limit myself to protein glues only, because I am aware that for certain purposes sodium silicate, an adhesive solution of starch, or a mixture of caustic magnesia and magnesium chloride solution comprising the well-known magnesium oxychloride cement, can be used; and all such cements, adhesives, glues and binders I regard as practical equivalents of the protein glues I have mentioned in the principal disclosure of this patent.

The excelsior is spread out in loose open masses and sprayed or sprinkled with glue. More explicitly, the excelsior is distributed in a layer, which, because of the natural tendency of long, slender shavings of wood to gather into loose, fluffy balls, forms an open mass of such character that all the parts thereof are accessible to the finely divided particles of adhesive which I project upon it and into it by means of a spray. Moreover, tangled masses of excelsior, placed in juxtaposition, tend to cling to one another so that a loosely connected unit which is suitable for subsequent bundling and pressing into a board is formed. After a sufficient amount of glue to give satisfactory adhesion has been deposited on the strands, the excelsior is gathered into a roll or bundle and heavily compressed to approximately one-sixth to one-tenth, or less, of its original volume between plates or rolls to a board of the desired thickness and density. The pressed boards or sheets can be removed from the press or rolls as soon as the glue has taken its initial set, after which they are subjected to a drying process, which may be carried out in the air or, more expeditiously, in a heated dryer.

Although the board made as described cannot readily be ignited, it can be rendered non-inflammable by spraying its surfaces with the above-mentioned glue or a mineralized or ammoniated modification thereof. It can be rendered impervious to water by a suitable treatment with molten sulfur, an alginate preparation, a solution of rubber, asphalt, pitch, gum, resin, lacquer, paint or a magnesium oxychloride or other cement.

The composition I have described can be used in its natural state as a rough finished board, or it can be used as a base for plaster, cement, or stucco. Veneer, wall paper, oil cloth, linoleum, fabrics of different kinds, cardboard and other pulp boards can be attached to the surface of my board for a facing. It can also be covered with a layer of wood flour, dusted on and adhesively secured. Dyed strands can be incorporated in the excelsior so as to produce decorative color effects. Furthermore, wood flours, dyed to different tints, can be applied so as to add a colored stenciled design.

I conceived of this composition originally as a wall board, but I do not wish to confine myself to that application solely, for I believe it is adapted for use as a floor board, partition board, insulation board, rough finish board, panel board and plaster base. Its properties also suggest it for use as a core board in the manufacture of plywood panels. It can also conceivably be pressed into the form of shingles or sheet roofing; and in view of its toughness and durability it appears to have possibilities as a board for use in various kinds of shipping containers. Since the composition I have described can be pressed into curved shapes as well as flat and molded into different forms, it may be wrought into imitation tiles and shaped frames for various cement and plaster coated objects, and all such uses are intended to be comprehended in the designation "composition board" as employed in the specification and claims.

The structure of my improved composition board will be evident from the foregoing description of its ingredients and method of manufacture; but with a view to affording an illustration of its general appearance, I have shown an example thereof in the accompanying drawing wherein—

Figure 2:
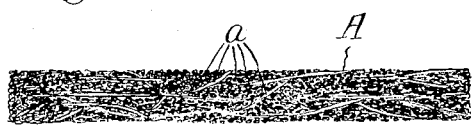

Fig. 1 is a fragmentary plan view of a section of wall board made in accordance with the invention; and Fig. 2 is an edge view of the same.

In Figs. 1 and 2, A designates the board as an entirety and a the individual strands of excelsior or the like of which it is mainly composed.

I claim—

1. A light, strong composition board, comprising a rigid network of slender shavings of wood, lightly coated with and bonded together at their numerous points of contact with one another by a protein glue, employed in such an amount and distributed in such manner as to leave numerous dead air spaces throughout the mass, the whole being in a strongly compressed condition.

2. A light, strong composition product, comprising a rigid network of slender shavings of wood, lightly coated with and united at their numerous points of contact with one another by a fire-resistant, water-resistant protein glue having a strength approximately equal to that of wood, said glue being employed in such an amount and distributed in such manner as to leave numerous interstices throughout the mass, and the whole being strongly compressed and formed into a board.

3. A light, strong composition board, comprising a rigid network of slender shavings of wood, lightly coated with and bonded together at their numerous points of contact with one another by a fire-resistant, water-resistant casein solution of great adhesive strength, employed in such an amount and distributed in such manner as to leave numerous dead air spaces throughout the mass, the whole being in a strongly compressed condition.

4. A building board of great strength, stiffness, and minimal swelling characteristics, consisting of strands of excelsior, flattened by heavy pressure substantially into the plane of the board, and an adhesive, employed in such an amount and distributed in such manner as to coat the said strands lightly therewith, to bind them rigidly and securely together at their numerous points of contact with one another, and to leave a plurality of unfilled interstices, or dead air spaces, distributed throughout the board.

5. An insulating wall board, characterized by great tensile strength and rigidity, and consisting of long slender strands of natural wood, flattened under heavy pressure into the plane of the board, and a fire-resistant, water-resistant casein adhesive, which is sufficient in amount to coat the said strands lightly therewith and unite them firmly together at their numerous points of contact with one another, and is distributed in such manner as leave numerous interstices throughout the whole.

6. A light, strong composition board, comprising a rigid network of strands of excelsior, lightly coated with and bonded together at their numerous points of contact with one another by a fire-resistant, water-resistant protein glue, employed in such an amount and distributed in such manner as to leave numerous dead air spaces throughout the mass, the whole being in a strongly compressed condition.

7. A light, strong insulating plaster base, comprising a rigid network of strands of excelsior, lightly coated with and bonded together at their numerous points of contact with one another by a fire-resistant, water-resistant protein glue, said glue being employed in such an amount and distributed in such manner as to leave numerous interstices between the strands, the whole being strongly compressed and formed into a board presenting a rough irregular surface.

8. The process of making a light, strong composition board, which consists of preparing long, slender, curly shavings of natural wood, forming them into an even layer of tangled, open masses, spraying them with a fire-resistant, water-resistant protein glue so that the shavings are lightly coated therewith, folding the sprayed layers into a roll or bundle, heavily compressing said roll or bundle into a board in such a manner that the shavings are forced to lie substantially in the plane of the board, and then drying the board.

FRANK J. HALLAUER.